United States Patent [19]

Naito

[11] Patent Number: 4,577,342

[45] Date of Patent: Mar. 18, 1986

[54] DISTORTION CANCEL CIRCUIT IN FM STEREO

[75] Inventor: Michinori Naito, Tokyo, Japan

[73] Assignee: Trio Kabushiki Kaisha, Tokyo, Japan

[21] Appl. No.: 584,881

[22] Filed: Feb. 29, 1984

[30] Foreign Application Priority Data

Mar. 4, 1983 [JP] Japan .............................. 58-30555[U]

[51] Int. Cl.$^4$ .............................................. H04H 5/00
[52] U.S. Cl. ...................................... 381/13; 455/305; 455/312
[58] Field of Search ........................ 381/1, 2, 3, 4, 10, 381/13; 455/303, 304, 305, 306, 312

[56] References Cited

U.S. PATENT DOCUMENTS 4,069,398 1/1978 Fujie ..................................... 455/305
4,246,541 1/1981 Ishigaki .............................. 455/305
4,408,352 10/1983 Dudding ............................ 455/305

Primary Examiner—Forester W. Isen
Attorney, Agent, or Firm—Murray, Whisenhunt and Ferguson

[57] ABSTRACT

There is disclosed a distortion cancel circuit in FM stereo receiver, which circuit synthesizes a canceling signal mainly including the distortion component by performing the arithmetic operation for an FM demodulation signal and adjusts the level of this synthesized canceling signal and thereafter subtractively combining it with the FM demodulation signal. This circuit enables the elimination of harmonic distortion which appears in the stereo MPX signal output due to the band characteristic of an intermediate frequency amplifier.

4 Claims, 2 Drawing Figures

4,577,342

DISTORTION CANCEL CIRCUIT IN FM STEREO

FIELD OF THE INVENTION

The present invention relates to a distortion cancel circuit in an FM stereo receiver.

BACKGROUND OF THE INVENTION

In FM receivers, harmonic distortion is caused in an FM demodulation signal due to the frequency vs amplitude and the frequency vs phase characteristics of a band-pass filter in an intermediate frequency (IF) amplifier circuit. This harmonic distortion is mixed by a stereo MPX circuit and exerts distortion to the right and left channel signals, respectively. On the other hand, in FM receivers of higher grade, some of them are provided with a wide band IF amplifier and a narrow band IF amplifier and select one of the wide band and the narrow band in accordance with the receiving conditions. In such receivers, the degrees of harmonic distortions differ in the cases of wide band and narrow band.

SUMMARY OF THE INVENTION

It is an object of the present invention to provide a circuit which can cancel the distortion to be caused due to the characteristic of an IF amplifier in an FM receiver, i.e., the distortion which appears in a stereo demodulation signal output.

Still another object of the invention is to provide a circuit constitution whereby in the case where the band-pass characteristic of an IF amplifier was switched, it is possible to cancel the distortion in response to the switched characteristic.

The above objects are accomplished by a distortion cancel circuit inserted between an FM demodulator and a stereo MPX circuit, which cancel circuit comprises: a circuit for arithmetically synthesizing a cancelling signal which mainly includes the distortion component from an FM demodulation signal; and a circuit for adjusting the level of this synthesized cancelling signal and subtractively combining with the FM demodulation signal.

In an embodiment of the present invnetion, the level adjustment of the cancelling signal is determined selectively in accordance with the change-over between a wide band pass filter and a narrow band pass filter in the IF amplifier circuit.

BRIEF DESCRIPTION OF THE DRAWINGS

The invention will be better understood and objects other than those set forth above will become apparent when consideration is given to the following detailed description thereof. Such description makes reference to the annexed drawings, wherein.

DESCRIPTION OF THE PREFERRED EMBODIMENTS

Figure 1:
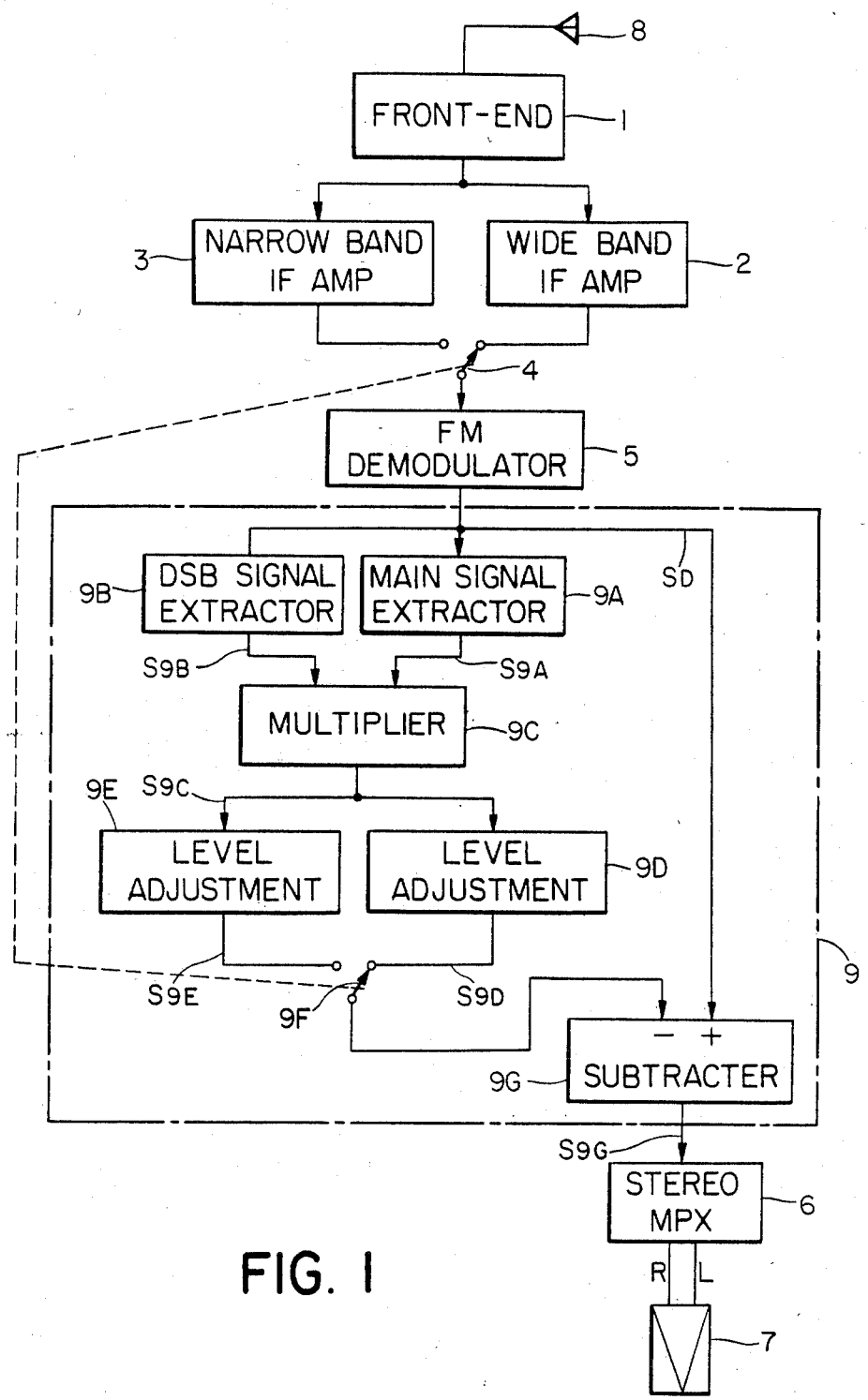
FIG. 1 is a schematic block diagram of an FM stereo receiver including a first embodiment of a distortion cancel circuit in accordance with the invention.

An FM stereo receiver including a first embodiment of the present invention shown in FIG. 1 comprises: a front-end 1; a wide band inetermediate frequency (IF) amplifier 2 and a narrow band IF amplifier 3 for selectively amplifying an intermediate frequency signal to be outputted from the front-end 1; a change-over switching circuit 4 for selectively outputting either one of an output of the wide band IF amplifier 2 and an output of the narrow band IF amplifier 3; an FM demodulator 5 for FM-demodulating an output to be supplied through the changeover switching circuit 4; a stereo MPX circuit 6 for stereo-demodulating the FM demodulation signal which was FM-demodulated; a distortion cancel circuit 9, inserted between the FM demodulator 5 and the stereo MPX circuit 6, for cancelling the harmonic distortion; and a low frequency amplifier 7 for respectively amplifying the stereo MPX outputs of which the distortion was cancelled.

In the first embodiment with such a constitution as described above, the functions of the front-end 1 to the stereo MPX circuit 6 are the same as those in a conventional FM stereo receiver. Either one of the output of the wide band IF amplifier 2 and the output of the narrow band IF amplifier 3 is selected by the change-over switching circuit 4 in accordance with the state of the broadcasting radio waves, thereby performing the reception suitable for the state of the broadcasting radio waves.

On the other hand, a modulation signal $S_M$ when only one of the stereo signals in the right and left channels was modulated by way of the cosine wave cos pt ($0 < p \leq 2\pi \times 15$ kHz) is represented by $$SM = \frac{L+R}{2} + \frac{L-R}{2} \cos \omega_c t$$

$$= \frac{1}{2} \cos pt + \frac{1}{2} \cos pt \cos \omega_c t$$

In the above expression, the first term indicates a main signal and the second term denotes a sub-signal; a pilot signal is omitted; and $\chi_c$ is an angular frequency of a subcarrier signal. An FM demodulation signal $S_D$ as an output of the FM demodulator 5 when the broadcast of the above-mentioned modulation signal $S_M$ was received can be represented by $$S_D = \frac{1}{2} \cos pt + \frac{1}{4} \cos(\omega_c + p)t + \frac{1}{4} \cos(\omega_c - p)t +$$

$$k \cos(\omega_c + 2p)t + k \cos(\omega_c - 2p)t$$

in consideration of only the second-order harmonic distortion component to be caused due to the influence of the band-pass filter of the IF amplifier. In the above expression, k is a constant to be determined depending upon the characteristic which the band-pass filter of the IF amplifier represents. In addition, a constant k for the wide band IF amplifier 2 is set into $k_1$, while a constant k for the narrow band IF amplifier 3 is set into $k_2$. These constants $k_1$ and $k_2$ will be represented by k unless otherwise specified by them.

The demodulation signal $S_D$ which was subjected to this distoriton is inputted to the distortion cancel circuit 9 of the present invnetion. The distortion cancel circuit 9 comprises: a main signal extractor $9_A$ for extracting the main signal from the FM demodulation signal $S_D$; a double side band (DSB) signal extractor $9_B$ for extracting a double side band (DSB) signal as the subsignal from the FM demodulation signal $S_D$; a multiplier $9_C$ for multiplying an output of the main signal extractor $9_A$ with an output of the DSB signal extractor $9_B$; level adjustment circuits $9_D$ and $9_E$ for adjusting the level of an output of the multiplier $9_C$; a change-over switching circuit $9_F$ for selectively outputting either one of an output of the level adjustment circuit $9_D$ and an output of the level adjustment circuit $9_E$ by being switched in association with the change-over switching circuit 4; and a subtractor $9_G$ for subtracting an output of the change-over switching circuit $9_F$ from the FM demodulation signal $S_D$ and supplying an output to the stereo MPX circuit 6.

When this FM demodulation signal $S_D$ is multiplied with the subcarrier signal by the stereo MPX circuit 6 for the stereo demodulation, the components ($\omega_2+2p$) and ($\omega_c-2p$) of the fourth and fifth terms in the above-mentioned expression relating to the FM demodulation signal $S_D$ become the components $2_p$, respectively, so that they appear in the stereo MPX output signal as the secondary harmonic distortion of the fundamental wave. However, this secondary harmonic distortion component will be cancelled by the distortion cancel circuit 9 in such a manner as will be described below. First of all, an output signal $S_{9A}$ of the circuit $9A$ for extracting the main signal as $L+R/2$ and an output signal $S_{9B}$ of the circuit $9_B$ for extracting and DSB signal as the sub-signal of $L-R/2 \cos(\omega_c t)$ are represented by the following expression.

$$S_{9A} = \frac{1}{2}\cos pt$$

$$S_{9B} = \frac{1}{4}\cos(\omega_c + p)t + \frac{1}{4}\cos(\omega_c - p)t + k\cos(\omega_c + 2p)t + k\cos(\omega_c - 2p)t$$

An output signal $S_{9C}$ of the multiplier $9_C$ is $$S_{9C} = S_{9A} \times S_{9B}$$
$$= \frac{1}{16}\cos(\omega_c + 2p)t + \frac{1}{16}\cos\omega_c t +$$
$$\frac{1}{16}\cos(\omega_c - 2p)t + \frac{1}{16}\cos\omega_c t +$$
$$\frac{k}{4}\cos(\omega_c - 3p)t + \frac{k}{4}\cos(\omega_c + p)t +$$
$$\frac{k}{4}\cos(\omega_c - 3p)t + \frac{k}{4}\cos(\omega_c - p)t$$

The input/output level ratio of the level adjustment circuit $9_D$ was set into $l_1$ (=16k$_1$), while the input/output level ratio of the level adjustment circuit $9_E$ was set into $l_2$ (=16k$_2$). An output signal $S_{9D}$ of the level adjustment circuit $9_D$ is $$S_{9D} = \frac{l_1}{16}\cos(\omega_c + 2p)t + \frac{l_1}{16}\cos\omega_c t +$$
$$\frac{l_1}{16}\cos(\omega_c - 2p)t + \frac{l_1}{16}\cos\omega_c t +$$
$$\frac{kl_1}{4}\cos(\omega_c + 3p)t + \frac{kl_1}{4}\cos(\omega_c + p)t +$$
$$\frac{kl_1}{4}\cos(\omega_c - 3p)t + \frac{kl_1}{4}\cos(\omega_c - p)t$$

Now, since it is discussed a problem with respect to a range where the level of the distortion component is very smaller than the level of the fundamental signal, it is possible to regard as $k \ll 1$ and $l_1, l_2 \ll 1$. In addition, since the $\omega_c$ component is irrespective of the distortion, it can be omitted. Then we will have $$S_{9D} \approx \frac{l_1}{16}\cos(\omega_c + 2p)t + \frac{l_1}{16}\cos(\omega_c - 2p)t$$

Similarly, an output signal $S_{9E}$ of the level adjustment circuit $9_E$ is $$S_{9E} \approx \frac{l_2}{16}\cos(\omega_c + 2p)t + \frac{l_2}{16}\cos(\omega_c - 2p)t.$$

When the output of the wide band IF amplifier 2 was selected by the change-over switching circuit 4, the output of the level adjustment circuit $9_D$ is selected by the change-over switching circuit $9_F$.

Therefore, an output signal $S_{9G}$ of the subtracter $9_G$ in this case will be $$S_{9G} = S_D - S_{9D}$$
$$= \frac{1}{2}\cos pt + \frac{1}{4}(\omega_c + p)t + \frac{1}{4}\cos(\omega_c - p)t +$$
$$\left(k_1 - \frac{l_1}{16}\right)\cos(\omega_c + 2p)t + \left(k_1 - \frac{l_1}{16}\right)\cos(\omega_c - 2p)t$$

Now, since $l_1=16k_1$, the components ($\omega_c+2p$) and ($\omega_c-2p$) in the output signal $S_{9G}$ of the subtracter $9_G$ become zero, so that when the output signal of the subtracter $9_G$ is multiplied with the subcarrier by the stereo MPX circuit 6 and is stereo-demodulated, the secondary harmonic distortion component does not exist in the stereo MPX signal.

In addition, when the output of the narrow band IF amplifier 3 was selected by the change-over switching circuit 4, the output of the level adjustment circuit $9_E$ is selected by the change-over switching circuit $9_F$.

Therefore, the output signal $S_{9G}$ of the subtracter $9_G$ in this case will be $$S_{9G} = \frac{1}{2}\cos pt + \frac{1}{4}(\omega_c + p)t + \frac{1}{4}\cos(\omega_c - p)t +$$
$$\left(k_2 - \frac{l_2}{16}\right)\cos(\omega_c + 2p)t + \left(k_2 - \frac{l_2}{16}\right)\cos(\omega_c - 2p)t$$

Now, since $l_2=16k_2$, the components ($\omega_c+2p$) and ($\omega_c-2p$) in the output signal $S_{9G}$ of the subtracter $9_G$ become zero, so that in this case, the secondary harmonic distortion component does not exist in the stereo MPX signal.

Figure 2:
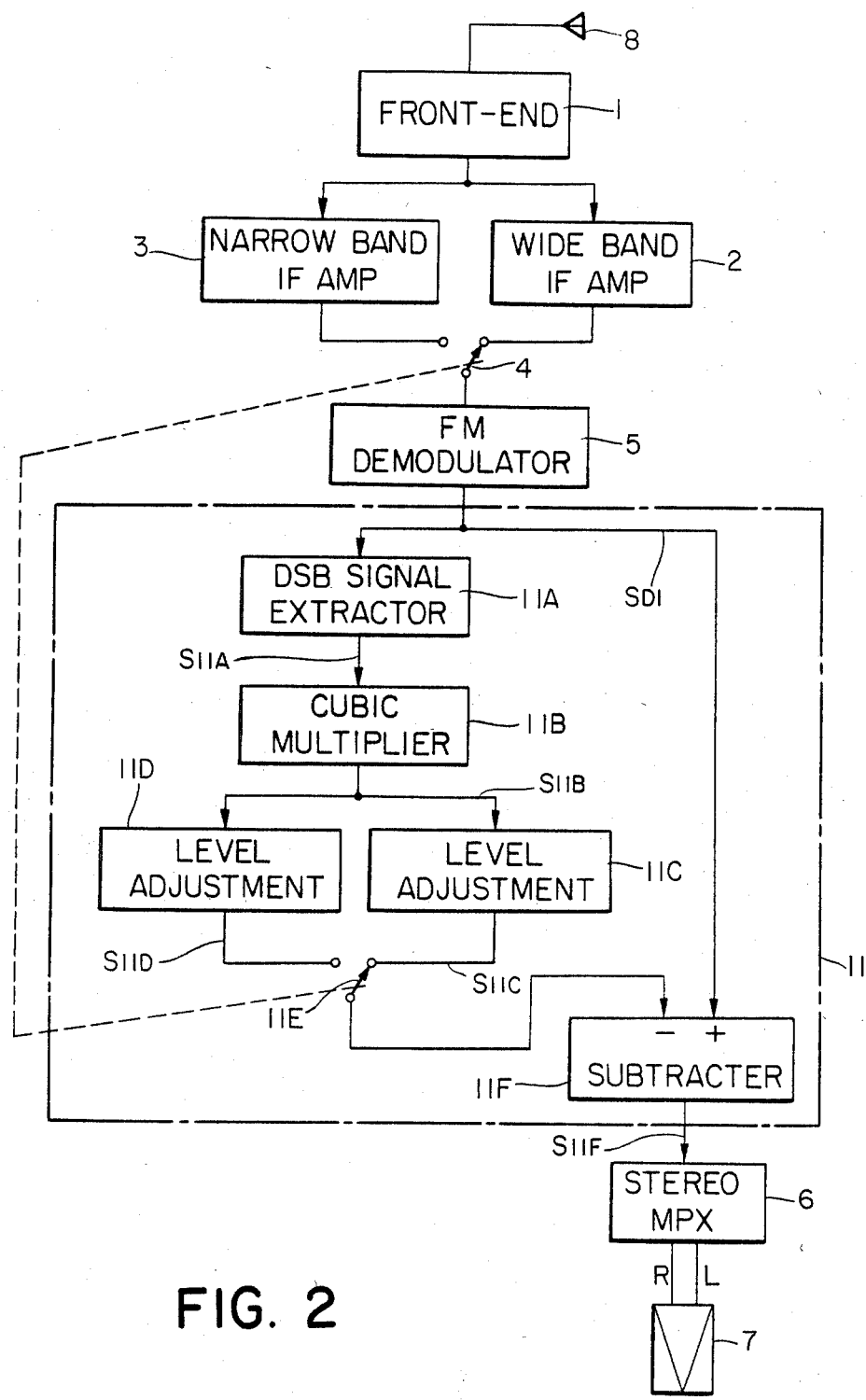
FIG. 2 is a schematic block diagram of an FM stereo receiver including a second embodiment of a distortion cancel circuit in accordance with the invention.

A second embodiment of the present invention will then be described with reference to FIG. 2 to cancel the third-order harmonic distortion.

When the considering only the third-order harmonic distortion component to be caused due to the influence of the band-pass filter of the IF amplifier, an FM demodulation signal $S_{D1}$ can be represented by $$S_{D1} = \frac{1}{2}\cos(\omega_c + p)t + \frac{1}{2}\cos(\omega_c - p)t +$$
$$k\cos(\omega_c + 3p)t + k\cos(\omega_c - 3p)t$$

where, k is the same as in the case of the first embodiment of the present invention.

A distortion cancel circuit 11 comprises: a double side band (DSB) signal extractor $11_A$ for extracting the double side band (DSB) signal as the sub-signal from the FM demodulation signal; a cubic multiplier $11_B$ for cubing an output of the DSB signal extractor $11_A$; level adjustment circuits $11_C$ and $11_D$ for adjusting the level of an output of the cubic multiplier $11_B$; a change-over switching circuit $11_E$ for selectively outputting either one of an output of the level adjustment circuit $11C$ and an output of the level adjustment circuit $11_D$ in association with the change-over switching circuit 4; and a subtractor $11_F$ for subtracting an output of the change-over switching circuit $11_E$ from the FM demodulation signal.

When this FM demodulation signal $S_{D1}$ is multiplied with the subcarrier signal by the stereo MPX circuit 6 for the stereo demodulation, the components $(\omega_c+3p)$ and $(\omega_c-3p)$ of the third and fourth terms in the above expression regarding to the FM demodulation signal $S_{D1}$ become the components 3p, respectively, so that they appear in the stereo MPX signal as the third-order harmonic distortion of the fundamental wave. However, this third-order harmonic distortion will be canceled by the distortion cancel circuit 11 in such a manner as will be described below.

First of all, an output signal $S_{11A}$ of the DSB signal extractor $11_A$ when the FM demodulation signal $S_{D1}$ was supplied is $$S_{11A} = \frac{1}{2}\cos(\omega_c + p)t + \frac{1}{2}\cos(\omega_c - p)t +$$

$$k\cos(\omega_c + 3p)t + k\cos(\omega_c - 3p)t$$

The output signal $S_{11A}$ and the FM demodulation signal $s_{D1}$ are equal. Therefore, although it seems that the DSB signal extractor $11_A$ is unnecessary, the above-mentioned case relates to the case where the main (1+R) signal component does not exist and this main signal component also certainly exists generally in the actual situation. Consequently, the DSB signal extractor $11_A$ is needed to prevent the presence of the main (L+R) signal component in the output signal $S_{11A}$.

On the other hand, since it is discussed a problem with regard to a range where the level of the distortion component is very smaller than the level of the fundamental wave signal, it is possible to regard as $|k| << 1$.

Therefore, when ignoring the third and fourth terms in the output signal $S_{11A}$ of the DSB signal extractor $11_A$, an output signal $S_{11B}$ of the cubic multiplier $11_B$ will be $$S_{11B} \approx \left[\frac{1}{2}\cos(\omega_c + p)t + \frac{1}{2}\cos(\omega_c - p)t\right]^3$$

$$= \frac{1}{8}\cos^3(\omega_c + p)t + \frac{3}{8}\cos^2(\omega_c + p)t\cos(\omega_c - p)t +$$

$$\frac{3}{8}\cos(\omega_c + p)t\cos^2(\omega_c - p)t + \frac{1}{8}\cos^3(\omega_c - p)t$$

$$= \frac{9}{32}[\cos(\omega_c + p)t + \cos(\omega_c - p)t] +$$

$$\frac{1}{32}[\cos(3\omega_c + p)t + \cos(3\omega_c - 3p)t] +$$

$$\frac{1}{4}[\cos(3\omega_c + p)t + \cos(3\omega_c - p)t] +$$

$$\frac{1}{4}[\cos(\omega_c + 3p)t + \cos(\omega_c - 3p)t]$$

Since the components of $(3\omega_c+p)$, $(3\omega_c-p)$, $(3\omega_c+3p)$, $(3\omega_c-3p)$, $(\omega_c+p)$ and $(\omega_c-p)$ in the above-mentioned output signal $S_{11B}$ are irrespective of the distortion upon stereo demodulation, they can be omitted. Thus, the output signal $S_{11B}$ will be $$S_{11B} \approx \frac{1}{4}\cos(\omega_c + 3p)t + \frac{1}{4}\cos(\omega_c - 3p)t$$

Now, assuming that the input/output level ratio of the level adjustment circuit $11_C$ is $l_3$ $(=4k_1)$ and the input/output level ratio of the level adjustment circuit $11_D$ is $l_4$ $(=4k_2)$, an output signal $S_{11C}$ of the level adjustment circuit $11_C$ and an output signal $S_{11D}$ of the level adjustment circuit $11_D$ are respectively $$S_{11C} = \frac{l_3}{4}\cos(\omega_c + 3p)t + \frac{l_3}{4}\cos(\omega_c - 3p)t$$

$$S_{11D} = \frac{l_4}{4}\cos(\omega_c + 3p)t + \frac{l_4}{4}\cos(\omega_c - 3p)t$$

An output signal $S_{11F}$ of the subtracter $11_F$ when the output signal of the level adjustment circuit $11_C$ was selected by the change-over switching circuit $11_E$ is $$S_{11F} = S_{D1} - S_{11C}$$

$$= \frac{1}{2}\cos(\omega_c + p)t + \frac{1}{2}\cos(\omega_c - p)t +$$

$$k_1\cos(\omega_c + 3p)t + k_1\cos(\omega_c - 3p)t -$$

$$\frac{l_3}{4}\cos(\omega_c + 3p)t - \frac{l_3}{4}\cos(\omega_c - 3p)t$$

$$= \frac{1}{2}\cos(\omega_c + p)t + \frac{1}{2}\cos(\omega_c - p)t +$$

$$\left(k_1 - \frac{l_3}{4}\right)\cos(\omega_c + 3p)t + \left(k_1 - \frac{l_3}{4}\right)\cos(\omega_c - 3p)t$$

Since $l_3=4k_1$, the components $(\omega_c+3p)$ and $(\omega_c-3p)$ in the output signal $S_{11F}$ of the subtracter $11_F$ become zero. Thus, when the output signal of the subtracter $11_F$ was supplied of the stereo MPX circuit 6 and was multiplied with the subcarrier by the stereo MPX circuit 6 and was stereo-demodulated, the third-order harmonic distortion does not exist in the stereo MPX signal.

On the other hand, when the output signal of the level adjustment circuit $11_D$ was selected by the change-over switching circuit $11_E$, the output signal $S_{11F}$ of the subtracter $11_F$ is $$S_{11F} = S_{D1} - S_{11D}$$

$$= \frac{1}{2}\cos(\omega_c + p)t + \frac{1}{2}\cos(\omega_c - p)t +$$

$$k_2\cos(\omega_c + 3p)t + k_2\cos(\omega_c - 3p)t -$$

$$\frac{l_4}{4}\cos(\omega_c + 3p)t - \frac{l_4}{4}\cos(\omega_c - 3p)t$$

$$= \frac{1}{2} \cos(\omega_c + p)t + \frac{1}{2} \cos(\omega_c - p)t +$$

$$\left(k_2 - \frac{l_4}{4}\right) \cos(\omega_c + 3p)t + \left(k_2 - \frac{l_4}{4}\right) \cos(\omega_c - 3p)t$$

Now, since $l_4 = 4k_2$, the components of $(\omega_c + 3p)$ and $(\omega_c - 3p)$ in the output signal of the subtracter $11_F$ become zero, so that in the case where the output signal of the subtracter $11_F$ was stereo-demodulated, the thirdorder harmonic distortion does not exist in the stereo MPX signal.

As described above, according to the present invention, in an FM stereo receiver which was constituted in such a manner that the intermediate frequency bands can be switched, the adjustment value of the level adjustment circuit in the distortion cancel circuit is selected in response to the IF band selected; therefore, it is possible to make the most of an effect of the distortion cancel circuit, thereby enabling the reproduction output with little distortion to be obtained.

I claim:

1. A distortion cancel circuit in an FM stereo receiver having an IF stage, comprising:
   an input terminal at which is received an FM stereo demodulation signal which contains a distortion component generated in said IF stage;
   an output terminal connected to an input of an FM MPX circuit;
   a circuit for synthesizing a canceling signal to eliminate said distortion component generated in said IF stage by multiplying a main signal and a subsignal of said FM stereo demodulation signal at said input terminal;
   a circuit for adjusting the level of said synthesized canceling signal; and
   a circuit for subtractively combining said canceling signal whose level was adjusted with said FM stereo demodulation signal.

2. A distortion cancel circuit according to claim 1, wherein said level adjustment circuit can change the level adjustment in accordance with the band characteristic of an intermediate frequency amplifier in said FM receiver.

3. A distortion cancel circuit in an FM stereo receiver having an IF stage, comprising:
   an input terminal at which is received an FM stereo demodulation signal which contains a distortion component generated in said IF stage;
   an output terminal connected to an input of an FM MPX circuit;
   a circuit for synthesizing a canceling signal to eliminate said distortion component generated in said IF stage by cubing a sub-signal of said FM stereo demodulation signal at said input terminal;
   a circuit for adjusting the level of said synthesized canceling signal; and
   a circuit for subtractively combining said canceling signal whose level was adjusted with said FM stereo demodulation signal.

4. A distortion cancel circuit accoriding to claim 3, wherein said level adjustment circuit can change the level adjustment in accordance with the band characteristic of an intermediate frequency amplifier in said FM receiver.

* * * * *